United States Patent [19]

Bartlett

[11] 4,418,309

[45] * Nov. 29, 1983

[54] TWO PHASE INDUCTION MOTOR CIRCUIT WITH SERIES CONNECTED CENTER-TAPPED STATOR WINDINGS

[75] Inventor: Peter G. Bartlett, Davenport, Iowa

[73] Assignee: Automation Systems, Inc., Eldridge, Iowa

[*] Notice: The portion of the term of this patent subsequent to Jan. 14, 1998 has been disclaimed.

[21] Appl. No.: 397,929

[22] Filed: Jul. 13, 1982

[51] Int. Cl.³ .............................................. H02P 5/28
[52] U.S. Cl. .................................................. 318/818
[58] Field of Search ............... 318/748, 818, 696, 138, 318/685, 254; 361/31

[56] References Cited

U.S. PATENT DOCUMENTS

| | | | |
|---|---|---|---|
| 3,573,593 | 4/1971 | Beery | 318/696 |
| 4,121,144 | 10/1978 | Leenhouts | 318/696 |
| 4,140,955 | 2/1979 | Drabing | 318/696 |
| 4,278,926 | 7/1981 | Bartlett | 318/696 |
| 4,319,175 | 3/1982 | Leenhouts | 318/696 |
| 4,368,414 | 1/1983 | Watanabe | 318/696 |

Primary Examiner—J. V. Truhe
Assistant Examiner—Patrick C. Keane
Attorney, Agent, or Firm—Woodard, Weikart, Emhardt & Naughton

[57] ABSTRACT

An induction motor circuit which effectively prevents voltage spikes caused by leakage inductance of the induction motor stator windings without otherwise interfering with the overall operation of the induction motor. The circuit incorporates two windings between a common point and the positive supply and two other windings between the common point and the negative supply. Voltage spikes are suppressed by diodes connecting directly from the ends of each of the windings to the supply terminals oriented to the opposite end of the respective windings.

5 Claims, 1 Drawing Figure

U.S. Patent    Nov. 29, 1983    4,418,309
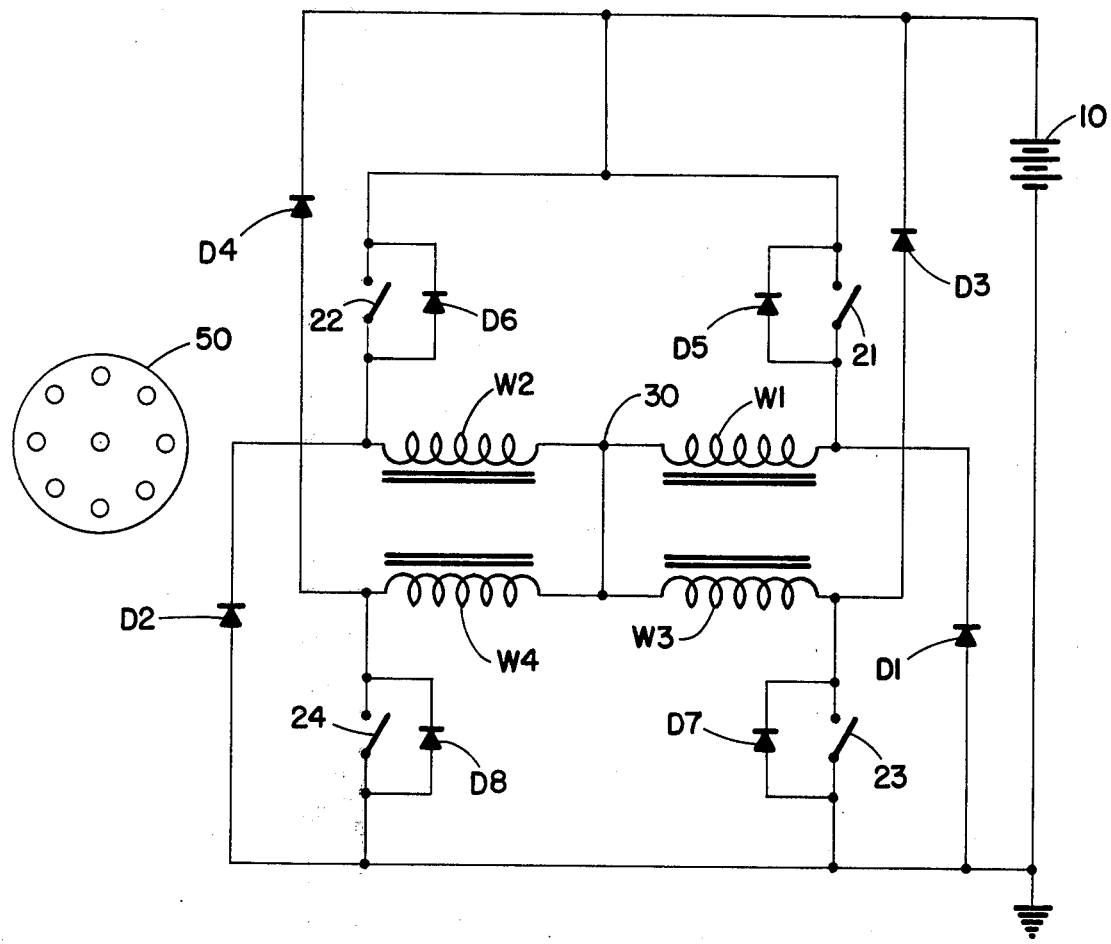

TWO PHASE INDUCTION MOTOR CIRCUIT WITH SERIES CONNECTED CENTER-TAPPED STATOR WINDINGS

BACKGROUND OF THE INVENTION

1. Field of the Invention

The circuit disclosed is a two phase induction motor circuit which incorporates center tapped stator windings.

Conventional two phase induction motors operate by energizing the stator windings with one winding 90° out of phase with the second. In normal operation of induction motors, losses are associated with inductance of the stator windings which is not coupled to the rotor. This uncoupled inductance is referred to a leakage inductance.

U.S. Pat. No. 4,278,926 to Peter G. Bartlett discloses a step motor circuit which effectively prevents voltage spikes caused by leakage inductance of the step motor windings without otherwise interfering with the overall operation of the step motor. It has been discovered that the same effect can readily be achieved in a two phase induction motor.

SUMMARY OF THE INVENTION

In general terms, the present invention is a highly energy efficient two phase induction motor circuit that reduces losses caused by leakage inductance without interfering with the normal operation of the induction motor circuit. This is accomplished by an arrangement of diodes connected between the ends of center tapped induction motor windings and the appropriate terminals of the power source. The diodes are arranged in such a manner so as to provide a despiking current path which does not flow through resistors or closed switch circuitry and therefore, does not waste power and does not interfere with the overall operation of the circuit. The present invention has the further advantage in that the despiking current path has the effect of recharging the power source, thus increasing the power efficiency of the circuit.

It is, therefore, an object of the present invention to provide an efficient induction motor circuit which solves the leakage inductance problem of induction motor circuits without interfering with the normal operation of the circuit.

It is a further object to provide such a circuit which is energy efficient.

These and other objects and advantages of the present invention will become more apparent from the following:

BRIEF DESCRIPTION OF THE DRAWINGS

The FIGURE is a circuit diagram of the two phase induction motor circuit which is the preferred embodiment of the present invention.

DESCRIPTION OF THE PREFERRED EMBODIMENT

The preferred embodiment of the invention is quite similar to the disclosure of U.S. Pat. No. 4,278,926 to Peter G. Bartlett, except that it incorporates an induction motor rather than a stepping motor.

Referring to the drawing, each of windings W1, W2, W3 and W4 has a first end connected to the other windings at a common electrical point 30. Diodes D1 and D2 connect between the second ends of windings W1 and W2, respectively and the ground terminal of battery 10. The anodes of diodes D1 and D2 are connected to the ground terminal. Diodes D3 and D4 connect between the second ends of windings W3 and W4, respectively and the positive voltage terminal of battery 10. The cathodes of diodes D3 and D4 are connected to the positive voltage terminal.

The second end of winding W1 is also switchably connected to the positive voltage terminal of battery 10 through switch means 21. A diode D5 is connected across switch means 21 with the anode of diode D5 being connected to winding W1. Likewise the second end of winding W2 is switchably connected to the positive voltage terminal of battery 10 through switch means 22. A diode D6 is connected across switch means 22 with the anode of diode D6 being connected to winding W2.

The second end of winding W3 is switchably connected to the ground terminal of battery 10 through switch means 23. A diode D7 is connected across switch means 23 with the cathode of diode D7 being connected to winding W3. Likewise the second end of the winding W4 is switchably connected to the ground terminal of battery 10 through switch means 24. A diode D8 is connected across switch means 24 with the cathode of diode D8 being connected to winding W4.

In the preferred embodiment, a conventional squirrel cage type rotor 50 is shown. However, the present invention could be used with any other suitable type of induction motor rotor. Also in the preferred embodiment, the switching signals to switch means 21-24 incorporate pulse width modulated direct current pulses. This current control is accomplished directly by switch means 21-24, without using an additional series current control device.

In a squirrel cage induction motor of the type disclosed in the preferred embodiment, there are two bifilar windings that consist of sub-windings W1-W2 for the first bifilar winding and sub-windings W3-W4 for the second bifilar winding.

During operation, switch means 21-24 control the path of current flowing through stator windings W1-4. In order to produce the current control cycles, the sub-windings are energized in the sequence $W_1 W_4$, $W_2 W_4$, $W_2 W_3$, $W_1 W_3$, $W_1 W_4$, etc., with each energization change rotating the magnetic field produced from the stator windings by 90°. This rotating magnetic field induces a magnetic field in squirrel cage rotor 50 causing said rotor to turn, as is well known in the art.

A leakage inductance problem occurs whenever one of the switch means 21-24 instantaneously changes from a closed state to an open state. For example, when this occurs at switch means 21, the inherent inductance of winding W1 attempts to continue to draw current, resulting in a negative spike at the end of winding W1 connecting with the opened switch 21. In prior art circuits, there are several disadvantages related to this voltage spike. In some circuits, the voltage spike may tend to damage the windings or the switch (typically a transistor). In some circuits of the prior art, the continued current flow through the winding works against the efficient operation of the induction motor by running through a circuit path which includes a resistive component, causing undesirable heating and resulting in wasted power.

In the preferred embodiment, the negative voltage spike which tends to occur at the point between winding W1 and switch means 21 when switch means 21 is instantaneously opened is prevented by diode D1. Diode D1 draws current from the negative voltage terminal of battery 10 instantaneously when winding W1 continues to draw current after switch means 21 has been opened. Thus the voltage at the point between winding W1 and switch means 21 does not fall below the voltage differential of D1 (about 0.7 volts) less than the negative terminal of battery 10 (ground). Further the despiking current path flows solely through a combination of diodes D1-4, windings W1-4 and battery 10. The actual current path will vary depending upon the direction of current flow through the windings at the time of the attempted voltage spike. These current paths do not include a resistor or other power consumptive component (except windings W1-4). High voltages do not appear across the switch means 21-24.

One example of such despiking current path is through winding W1, winding W3, diode D3, through battery 10 (charging it), and through diode D1 back to winding W1. In the actual circuit some of the despiking current flow may flow through one of the closed switch means (in the given example switch means 23 for instance); however, the arrangement of the diodes effectively prevents a voltage drop across any of the switch means 21-24 greater than the voltage drop of battery 10 (plus the approximately 0.7 volt drop across the diodes). This is because diode D3 despikes an increase in voltage at the point between winding W3 and switch means 23 in the same manner as diode D1 despikes the point between winding W1 and switch means 21.

In the preferred embodiment windings W1 and W2 are substantially identical sub-windings which together form a first bifilar winding. Likewise windings W3 and W4 together form a second bifilar winding which is substantially identical to the first bifilar winding. As a result of this arrangement, there is a transformer coupling action between the sub-windings of each bifilar winding. This series arrangement of the matched windings tends to cause the voltage at electrical point 30 to be maintained at about midway between the positive and the negative voltage of battery 10 while current is flowing through pairs of windings W1-W4. Also, the transformer action tends to produce a voltage at the external end of each temporarily dormant sub-windings equal to either the positive voltage or the negative voltage of battery 10. For instance if current is flowing through windings W1 and W3, then the transformer action tends to produce a voltage at the external end of winding W2 equal to ground and at the external end of winding W4 equal to the positive voltage of battery 10.

Any leakage inductance occurring in the circuit tends to cause the voltage at the external ends of windings W1-W4 to either increase above the positive voltage of battery 10 (for windings W3 and W4) or to decrease the voltage to less than ground (for windings W1 and W2). However, the arrangement of diodes D1-D4 effectively prevents a voltage transient from occurring to any extent greater than the 0.7 volt drop across these diodes. In this manner the circuit of the present invention effectively prevents virtually any harmful result from leakage inductance occurring upon pulsed operation of a particular combination of windings or upon a change in the combination of operating windings.

Certain types of voltage transients are also suppressed by diodes D5, D6, D7 and D8.

Utilizing a pulsed current increases the overall efficiency of the circuit of the present invention. Either between the times that each of the sets of sub-windings are energized, and/or periodically during the times they are energized, switch means 21-24 may briefly open all switches. The length of time of opening can be used to adjust the power level to the motor. Optionally, the length of time of opening can automatically be adjusted according to a sensed power factor to provide for increased efficiency. The width of the pulses may be adjusted to provide just the needed amount of power to deal with either a low load mode or a high load mode. In this manner the circuit tends to make the maximum use of this current and is therefore more efficient.

While there have been described above the principles of this invention in connection with specific apparatus, it is to be clearly understood that this description is made only by way of example and not as a limitation to the scope of the invention.

What is claimed is:

1. An induction motor circuit comprising:
   (a) a power source, having a first voltage terminal and a second, more positive, voltage terminal;
   (b) first, second, third, and fourth switch means;
   (c) first, second, third, and fourth induction motor stator windings, each of said windings having one end connecting to the other said windings; the other ends of said first and second windings being switchably connected to said second voltage terminal through said first and second switch means respectively; the other ends of said third and fourth windings being switchably connected to said first voltage terminal through said third and fourth switch means;
   (d) a first diode and a second diode, said diodes connecting the other ends of said first and said second windings with said first voltage terminal respectively; the anodes of said diodes being connected to said first voltage terminal;
   (e) a third diode and a fourth diode, said diodes connecting the other ends of said third winding and said fourth winding with said second voltage terminal respectively; the cathodes of said diodes being connected to said second voltage terminal.

2. The induction motor circuit of claim 1 in which said windings are directly connected to each other forming a common electrical point.

3. The induction motor circuit of claim 2 additionally comprising a fifth, sixth, seventh, and eighth diode and in which said fifth, sixth, seventh, and eighth diodes connect across said first, second, third, and fourth switch means respectively; the anodes of said fifth and sixth diodes being connected to said first and second windings respectively, and the cathodes of said seventh and eighth diodes being connected to said third and fourth windings respectively.

4. The induction motor circuit of claim 3 which includes a squirrel cage rotor positioned in the fields of said stator windings.

5. An induction motor circuit comprising:
   (a) an induction motor having first and second substantially identical transformer coupled sub-windings, the first ends of said sub-windings being connected to each other at a first electrical point;
   (b) first and second switch means for switchably connecting the second ends of said first and second sub-windings respectively to a second electrical point;
   (c) a third electrical point;

(d) means for causing the voltage at said first electrical point to be about midway between the voltages at said second electrical point and said third electrical point while current is flowing through a coil selected from the group consisting of said first and second sub-windings; and (e) first and second diodes connecting the second ends of said first and second sub-windings respectively to a third electrical point; said diodes being oriented such that when said switch means are closed, the flow of current between said second electrical point and said third electrical point through said diodes is prevented;

(f) third and fourth substantially identical transformer coupled sub-windings, the first ends of said third and fourth sub-windings being connected to each other at said first electrical point;

(g) third and fourth switch means for switchably connecting the second ends of said third and fourth sub-windings respectively to said third electrical point; and (h) third and fourth diodes connecting the second ends of said third and fourth sub-windings respectively to said second electrical point; said diodes being oriented such that when said third and fourth switch means are closed, the flow of current between said second electrical point and said third electrical point through said diodes is prevented.

* * * * *